(12) United States Patent
Balakrishnan et al.

(10) Patent No.: US 8,537,570 B2
(45) Date of Patent: *Sep. 17, 2013

(54) METHOD AND APPARATUS TO REDUCE AUDIO FREQUENCIES IN A SWITCHING POWER SUPPLY

(75) Inventors: Balu Balakrishnan, Saratoga, CA (US); Arthur B. Odell, Cupertino, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,192

(22) Filed: May 15, 2012

(65) Prior Publication Data

US 2012/0224399 A1 Sep. 6, 2012

Related U.S. Application Data

(63) Continuation of application No. 13/102,986, filed on May 6, 2011, now Pat. No. 8,194,423, which is a continuation of application No. 12/767,564, filed on Apr. 26, 2010, now Pat. No. 7,965,524, which is a continuation of application No. 12/276,222, filed on Nov. 21, 2008, now Pat. No. 7,733,673, which is a continuation of application No. 11/543,518, filed on Oct. 4, 2006, now Pat. No. 7,471,530.

(51) Int. Cl.
*H02M 3/335* (2006.01)

(52) U.S. Cl.
USPC .......... 363/21.01; 363/21.05; 363/21.11; 363/21.18; 363/41; 363/97; 323/283

(58) Field of Classification Search
USPC ............ 323/283; 363/21.01, 21.05, 21.11, 363/21.13, 21.18, 41, 95, 97
See application file for complete search history.

(56) References Cited

U.S. PATENT DOCUMENTS

| 4,937,727 A | 6/1990 | Leonardi |
| 4,937,728 A | 6/1990 | Leonardi |
| 5,745,352 A | 4/1998 | Sandri et al. |
| 5,751,565 A | 5/1998 | Faulk |

(Continued)

FOREIGN PATENT DOCUMENTS

| CN | 1679225 A | 10/2005 |
| JP | 2003-299356 | 10/2003 |

OTHER PUBLICATIONS

CN 200710192931—Second Chinese Office Action, with English Translation, issued Jun. 5, 2012 (7 pages).

(Continued)

*Primary Examiner* — Jeffrey Sterrett
(74) *Attorney, Agent, or Firm* — Blakely Sokoloff Taylor & Zafman LLP

(57) ABSTRACT

An example controller for use in a power supply regulator includes a switch signal generator, a modulation circuit, and a multi-cycle modulator circuit. The modulation circuit modulates the period of a modulation switching signal when an equivalent switching frequency is greater than a reference frequency and fixes the switching period when the equivalent switching frequency is less than the reference frequency. The multi-cycle modulator circuit enables the switch signal generator to provide a switch signal uninterrupted if the equivalent switching frequency is greater than the reference frequency and disables the switch signal generator for a first time period and then enables the switch signal generator for a second time period when the equivalent frequency is less than the reference frequency. The multi-cycle modulator circuit varies the first time period to regulate the output.

15 Claims, 10 Drawing Sheets

(56) References Cited

U.S. PATENT DOCUMENTS

| | | | |
|---|---|---|---|
| 5,914,865 | A | 6/1999 | Barbehenn et al. |
| 7,006,365 | B2 | 2/2006 | Kitano |
| 7,075,802 | B2 | 7/2006 | Yamashita |
| 7,079,404 | B2 | 7/2006 | Hong et al. |
| 7,084,799 | B1 | 8/2006 | Butler |
| 7,218,532 | B2 | 5/2007 | Choi et al. |
| 7,301,490 | B2 | 11/2007 | Butler |
| 7,471,530 | B2 | 12/2008 | Balakrishnan et al. |
| 7,733,673 | B2 | 6/2010 | Balakrishnan et al. |
| 7,782,638 | B2 | 8/2010 | Murata et al. |
| 7,894,222 | B2 | 2/2011 | Djenguerian et al. |
| 7,965,524 | B2 | 6/2011 | Balakrishnan et al. |
| 8,379,420 | B2 | 2/2013 | Orr |
| 2008/0084723 | A1 | 4/2008 | Balakrishnan et al. |
| 2009/0073733 | A1 | 3/2009 | Balakrishnan et al. |
| 2010/0202175 | A1 | 8/2010 | Balakrishnan et al. |
| 2011/0211373 | A1 | 9/2011 | Balakrishnan et al. |

OTHER PUBLICATIONS

"Taylorbrite Dimmers," *Navigating Innovation*, Taylor Made Products, http://www.taylormadeproducts.com/taylorbrite/dimmers.htm, Accessed Apr. 24, 2006; pp. 1-2.

Reiss, J.D., et al., "Efficient Compression of Oversampled 1-bit Audio Signals," Convention Paper Presented at the 111th Convention of the Audio Engineering Society, Sep. 21-24, 2001, New York, NY, pp. 1-4.

Esslinger, R., et al., "Digital Power Amplification Based on Pulse-Width Modulation and Sigma-Delta Loops. A Comparison of Current Solutions," Proceedings of the Institute of Radio Electronics, Czech and Slovak Radio Engineering Society (Radioelektronika '99), Brno, Czech Republic, Apr. 1999, pp. 1-4.

"VIPer53DIP; VIPer53SP—Off Line Primary Switch," ST Microelectronics, Jun. 2004, pp. 1-24.

"Application Note 28103.20—Switching Regulators Product Description: Series STR-A6100 Flyback Switching Regulators," Sanken Power Devices from Allegro MicroSystems, http://allegromicro.com/en/Products/Design/an/an28103020.pdf, Accessed Nov. 17, 2008, pp. 1-9.

"Application Note AN4102—A Fairchild Power Switch Based SMPS for Color Television Receivers," Rev. 1.0.2, Fairchild Semiconductor, Mar. 19, 2004, pp. 1-16.

"Application Note AN4105—Design Considerations for Switched Mode Power Supplies Using a Fairchild Power Switch (FPS) in a Flyback Converter," Rev. 1.0.2, Fairchild Semiconductor, Mar. 19, 2004, pp. 1-22.

"Application Note AN4108—A Fairchild Power Switch Based on Switched Mode Power Supply for CRT Monitor Use," Rev. 1.0.3, Fairchild Semiconductor, Mar. 19, 2004, pp. 1-16.

"Application Note AN4141—Troubleshooting and Design Tips for Fairchild Power Switch (FPS™) Flyback Applications," Rev. 1.0.0, Fairchild Semiconductor, Mar. 24, 2004, pp. 1-10.

"Application Note AN4146—Design Guidelines for Quasi-Resonant Converters Using FSCQ-series Fairchild Power Switch (FPS™)," Rev. 1.0.1, Fairchild Semiconductor, Sep. 20, 2005, pp. 1-24.

"Application Note AN4148—Audible Noise Reduction Techniques for FPS Applications," Rev. 1.0.0, Fairchild Semiconductor, Sep. 9, 2005, pp. 1-5.

Japanese Patent Application 260661/2007, Notice of Grounds of Rejection mailed Dec. 14, 2010. (10 pages).

CN 200710192931—First Chinese Office Action, issued Aug. 15, 2011, with English Translation (23 pages).

CN 200710192931—Third Chinese Office Action, issued Dec. 26, 2012 (3 pages).

CN 200710192931.6—Fourth Chinese Office Action, issued Apr. 2, 2013 (5 pages).

U.S. Appl. No. 13/242,947—Non-Final Office Action, mailed Apr. 11, 2013 (17 pages).

CN 200710192931.6—Third Chinese Office Action with English Translation, issued Dec. 26, 2012 (8 pages).

CN 200710192931.6—Fourth Chinese Office Action with English Translation, issued Apr. 2, 2013 (10 pages).

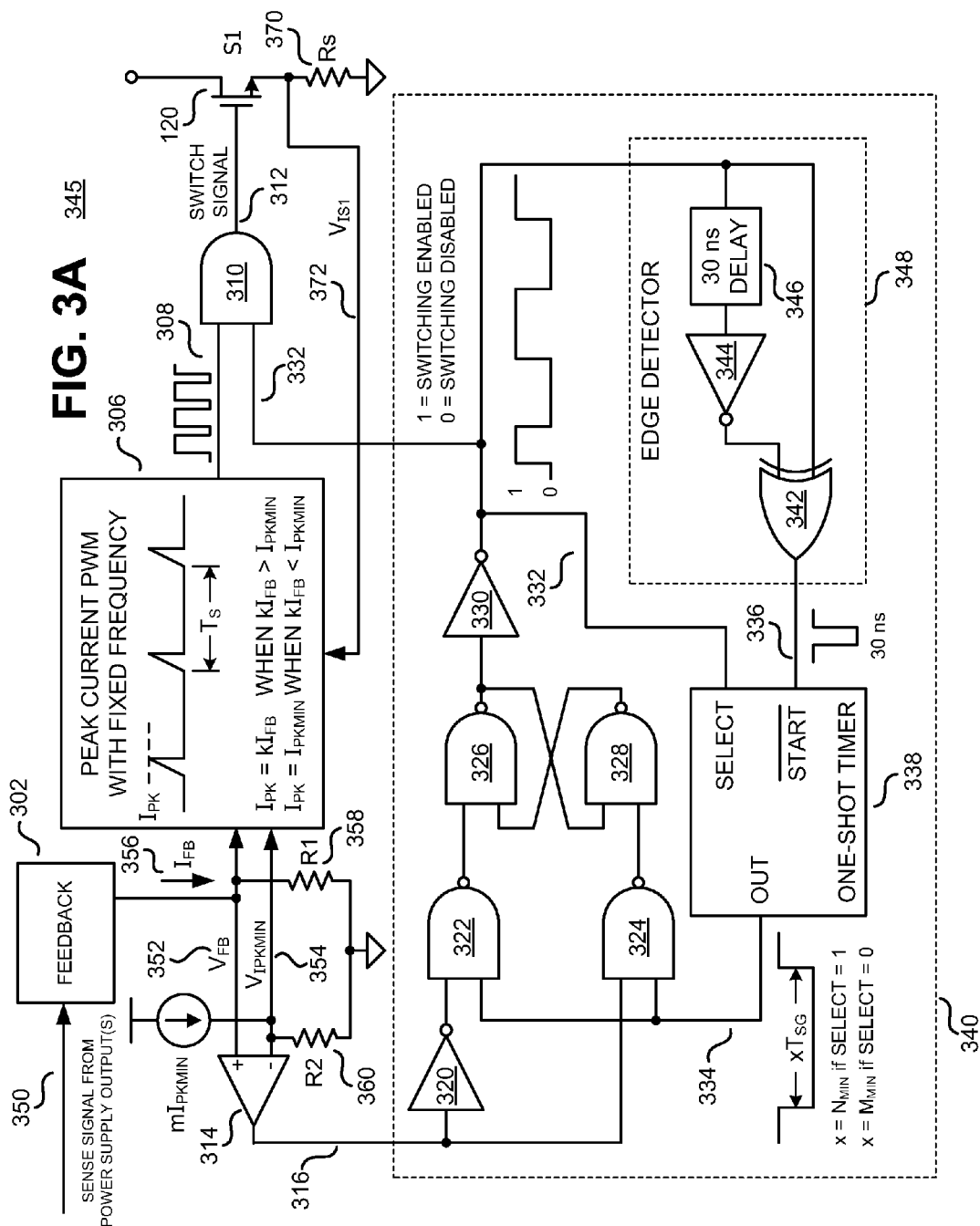

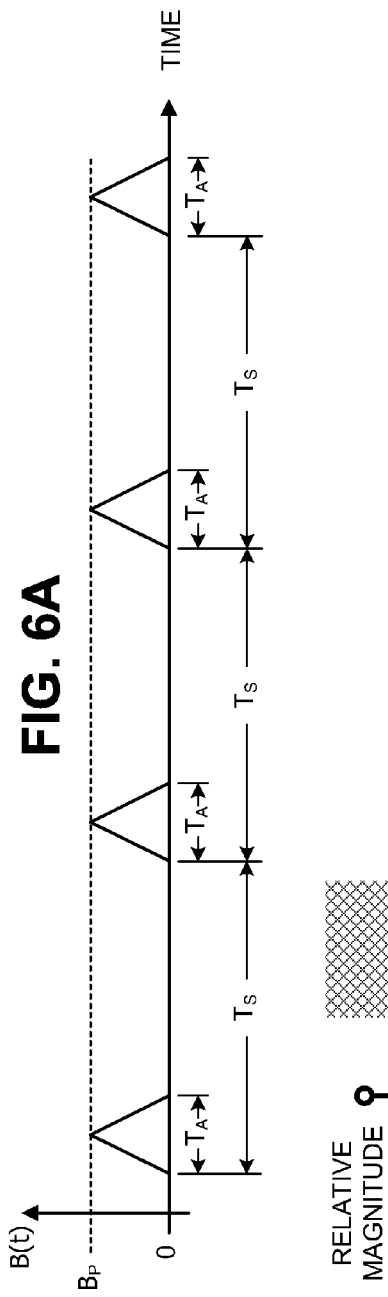
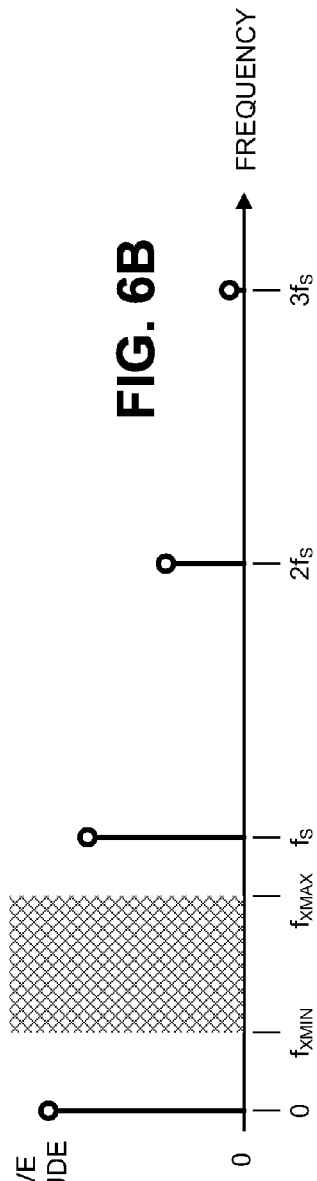
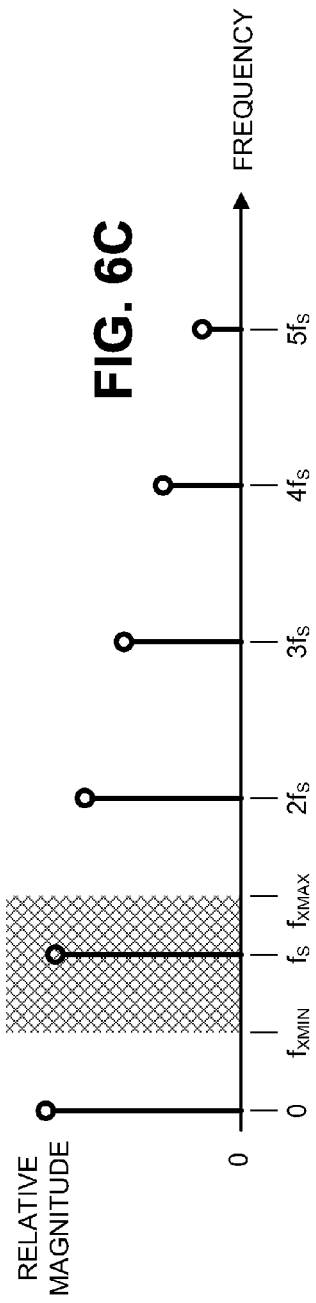

METHOD AND APPARATUS TO REDUCE AUDIO FREQUENCIES IN A SWITCHING POWER SUPPLY

REFERENCE TO PRIOR APPLICATIONS

This application is a continuation of U.S. application Ser. No. 13/102,986, filed May 6, 2011, now pending, which is a continuation of U.S. application Ser. No. 12/767,564, filed Apr. 26, 2010, now U.S. Pat. No. 7,965,524, which is a continuation of U.S. application Ser. No. 12/276,222, filed Nov. 21, 2008, now U.S. Pat. No. 7,733,673, which is a continuation of U.S. application Ser. No. 11/543,518, filed Oct. 4, 2006, now U.S. Pat. No. 7,471,530. U.S. application Ser. No. 13/102,986, and U.S. Pat. Nos. 7,965,524, 7,733,673 and 7,471,530 are hereby incorporated by reference.

BACKGROUND OF THE INVENTION

1. Field of the Invention

The present invention relates generally to power supplies and, more specifically, the present invention relates to a switching regulator.

2. Background Information

Electronic devices use power to operate. Switched mode power supplies are commonly used due to their high efficiency and good output regulation to power many of today's electronic devices. In a known switching power supply, a low frequency (e.g. 50 or 60 Hz mains frequency), high voltage alternating current (AC) is converted to high frequency (e.g. 30 to 300 kHz) AC, using a switched mode power supply control circuit. This high frequency, high voltage AC is applied to a transformer to transform the voltage, usually to a lower voltage, and to provide safety isolation. The output of the transformer is rectified to provide a regulated DC output, which may be used to power an electronic device. The switched mode power supply control circuit usually provides output regulation by sensing the output and controlling it in a closed loop.

The design of the switching power supply is a compromise among conflicting requirements of efficiency, size, weight, and cost. The optimal solution that delivers the rated output power usually sets the switching frequency much higher than 20 kHz, outside the range of human hearing.

Regulatory requirements call for power supplies to operate at high efficiency at low loads such as standby loads and consume very low power at no load. When a power supply delivers much less than its rated power, the energy lost within the power supply is dominated by losses from the action of switching. Therefore, it is necessary for the power supply to operate at lower switching frequencies when the output power is low to reduce the dominant losses. The switching frequency may be reduced linearly as the load reduces to maintain high efficiency. The optimal switching frequency at low power often falls within the band of audio frequencies below 20 kHz. Switching within the band of audio frequencies can produce undesirable audio noise in power supply components such as transformers and ceramic capacitors due to mechanical resonances.

A well-known technique to reduce switching losses and improve efficiency at light loads is to operate the power supply in a burst mode at light loads. Burst mode operation allows the power supply to switch an uncontrolled number of consecutive switching cycles at a high switching frequency followed by a duration of no switching adjusted in a closed loop to regulate the output. Thus, the average switching frequency is reduced to keep the efficiency high at light loads. An undesirable property of burst mode switching is that neither the number of consecutive high frequency switching cycles in the burst nor the number of consecutive cycles of no switching between bursts is determined for a given set of operating conditions. The indeterminate nature of burst mode operation creates the hazard of uncontrolled audio noise. In fact, if the repetition rate of the duration of consecutive switching cycles followed by the duration of no switching is at audio frequency, the audio noise could be worse than just reducing the frequency linearly as described earlier due to higher audio energy content. Audio noise is a major drawback of using burst mode operation for improving light load efficiency and reducing no load consumption.

One of the most troublesome sources of noise in a switching power supply is the transformer. Commonly used ferrite core transformers in switching power supplies tend to have mechanical resonant frequencies in the 8 kHz to 15 kHz range. Some ceramic capacitors, especially the ones used in the clamp circuit connected to the primary winding of the transformer in a flyback power supply, can also resonate at such audio frequencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3A is an example schematic illustrating generally an example controller of an example switching power supply providing power to a load in accordance with the teachings of the present invention.

FIG. 6A is a diagram illustrating generally an example of magnetic flux density in an energy transfer element of a switching power supply operating in a period modulation mode in accordance with the teachings of the present invention.

FIG. 6B is a diagram illustrating generally an example of partial frequency spectra in an energy transfer element of a switching power supply operating at high frequency in accordance with the teachings of the present invention.

FIG. 6C is a diagram illustrating generally an example of partial frequency spectra in an energy transfer element of a switching power supply operating at low frequency without multi-cycle modulation in accordance with the teachings of the present invention.

DETAILED DESCRIPTION

Methods and apparatuses for maintaining high efficiency while reducing audio frequencies in a switching power supply are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," "an example" or the like means that a particular feature, structure or characteristic described in connection with the embodiment or example is included in at least one embodiment or example of the present invention. Thus, appearances of the phrases "in one embodiment," "in an embodiment," "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

As will be discussed, examples of switching a switch of a power supply are disclosed that greatly reduce the mechanical excitation of power supply components at audio frequencies while maintaining the benefits of switching at an equivalent audio frequency. According to various examples, switching cycles with short periods are gathered into groups that are separated by intervals of no switching. Regulation of an output of the switching power supply is accomplished by controlling the duration of a group and the duration of no switching between groups of switching cycles of the switch in accordance with the teachings of the present invention.

Figures 1A, 1B:
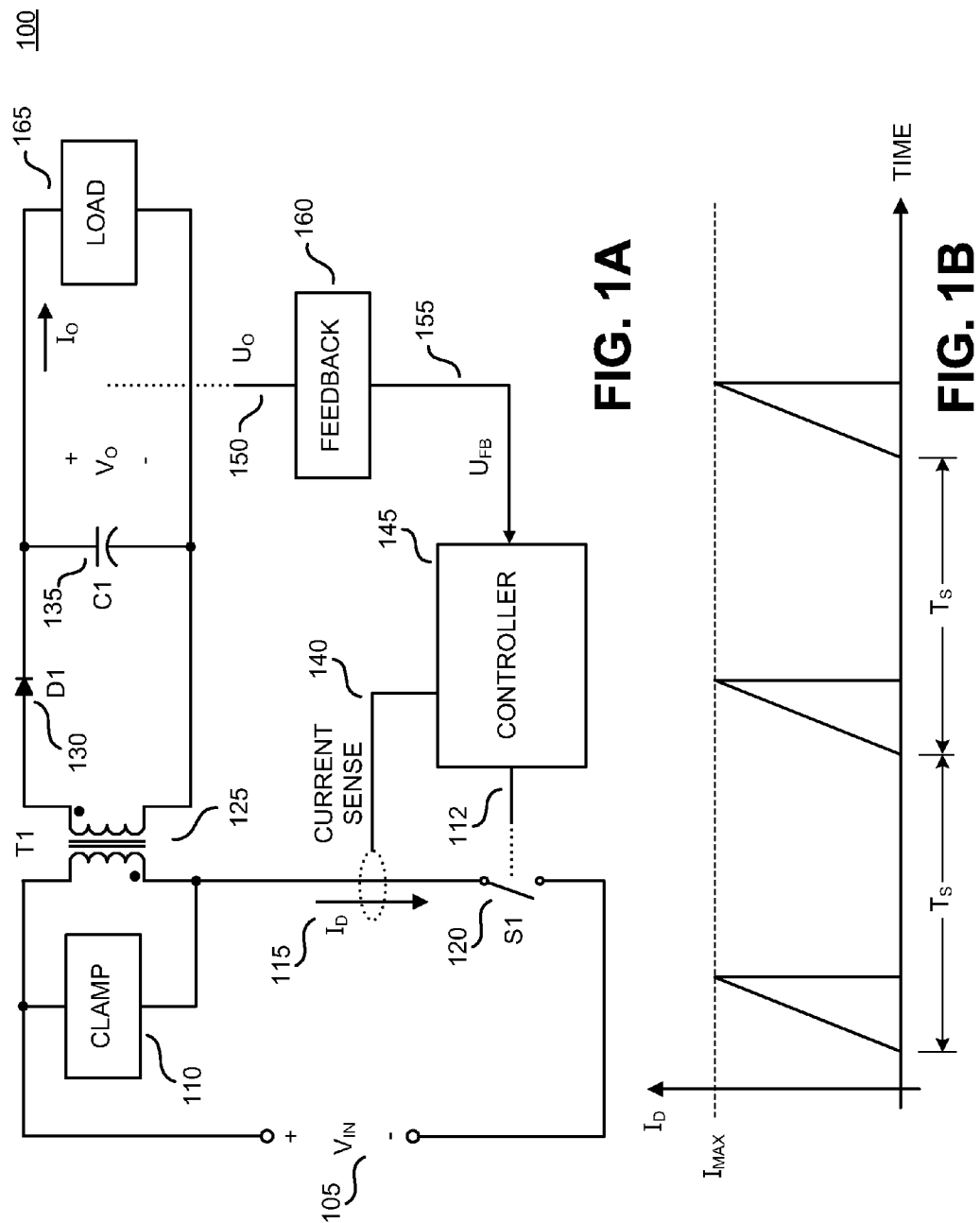
FIG. 1A is a block diagram illustrating generally an example switching power supply providing power to a load.
FIG. 1B is a diagram illustrating generally an example of a switching current waveform of the example switching power supply of FIG. 1A.

To illustrate, FIG. 1A shows generally a functional block diagram of an example switching power supply regulator 100. It is noted that the example switching power supply regulator 100 shown in FIG. 1A is a flyback regulator, which is one example of a switching power supply topology that may benefit from the teachings of the present invention. However, it is appreciated that other known topologies and configurations of switching power supply regulators may also benefit from the teachings of the present invention.

The example switching power supply regulator 100 in FIG. 1A provides output power to a load 165 from an unregulated input voltage VIN 105. The input voltage VIN 105 is coupled to an energy transfer element T1 125 and a switch S1 120. In the example of FIG. 1A, the energy transfer element T1 125 is a transformer with two windings. A clamp circuit 110 is coupled to the primary winding of the energy transfer element T1 125 to control the maximum voltage on the switch S1 120. Switch S1 120 is opened and closed in response to switch signal 112 received from controller circuit or controller 145. In the illustrated example, switch S1 120 is a transistor and controller 145 includes integrated circuits and/or discrete electrical components. In operation, the switching of switch S1 120 produces a pulsating current in the rectifier D1 130 that is filtered by capacitor C1 135 to produce a substantially constant output voltage Vo or output current $I_O$ at the load 165.

The output quantity to be regulated is $U_O$ 150, that in general could be an output voltage $V_O$, an output current $I_O$, or a combination of the two. A feedback circuit 160 is coupled to sense the output quantity $U_O$ 150 from the output of the power supply to produce a feedback signal $U_{FB}$ 155 that is an input to the controller 145. Another input to the controller 145 is the current sense signal 140 that senses a current $I_D$ 115 in switch S1 120. Any of the many known ways to measure a switched current, such as for example a current transformer, or for example the voltage across a discrete resistor, or for example the voltage across a transistor when the transistor is conducting, may be used to measure current $I_D$ 115.

In the example of FIG. 1A, the controller 145 operates switch S1 120 in response to system inputs to substantially regulate output quantity $U_O$ 150 to its desired value. The output of the power supply is therefore regulated in a closed loop. Controller 145 typically includes an oscillator that defines a switching cycle with a period $T_S$. Regulation may be accomplished by control of one or more switching parameters that determine the amount of energy transferred from the input to the output of the power supply regulator 100.

FIG. 1B is a graph showing generally current $I_D$ 115 as a function of time. In one example, switch S1 120 turns on at the beginning of each switching cycle. Switch S1 120 conducts until current $I_D$ 115 reaches a threshold $I_{MAX}$. In one example, control of the maximum current $I_{MAX}$ at a constant switching cycle period $T_S$ (a constant switching frequency) maintains an average of the current $I_D$ 115 at a value required to regulate the output quantity $U_O$ 150. The regulation is thus accomplished by a fixed frequency pulse width modulation technique known as fixed frequency peak current pulse width modulation (PWM) or as fixed frequency current mode control. In another example, regulation may be accomplished by changing the on time of the switch at fixed frequency. This mode of control is known as fixed frequency voltage mode control or fixed frequency voltage mode PWM. Although the association to voltage mode originated from its use to regulate an output voltage of a power supply, the term continues to be used to describe the same mode of control even when the regulated output is a current, or a combination of a voltage and a current. The term fixed frequency PWM covers both current mode and voltage mode controls operating at fixed frequency. In another example, regulation may be accomplished with another form of PWM known as period modulation or switching frequency modulation, where the current in the switch reaches a fixed peak value in every switching cycle and the period Ts is adjusted. At light loads that correspond to low average values of the current $I_D$, it is desired to operate at lower switching frequencies, usually within the range of audio frequencies, to reduce switching losses in the power supply. All three of the above modulation techniques involve modulation of the duty cycle and, therefore, are referred to by the general term "duty cycle modulation".

In practical applications, the average value of current $I_D$ 115 required to regulate the output quantity $U_O$ 150 may be an average over not one single switching cycle, but over a time that includes many switching cycles. The many switching cycles need not have the same period value. Many different sequences of switching cycles that contain different period values can produce an average current $I_D$ 115 that regulates the output quantity $U_O$ 150 within its specified limits.

It is desirable to control the period values and the sequences of switching cycles to avoid frequencies that can produce audio noise. As will be demonstrated later in this disclosure, the magnitudes of frequencies that can produce audio noise may be substantially reduced by gathering the switching cycles into groups of multiple cycles that are modulated to regulate an output in accordance with the teaching of the present invention.

Figure 2:
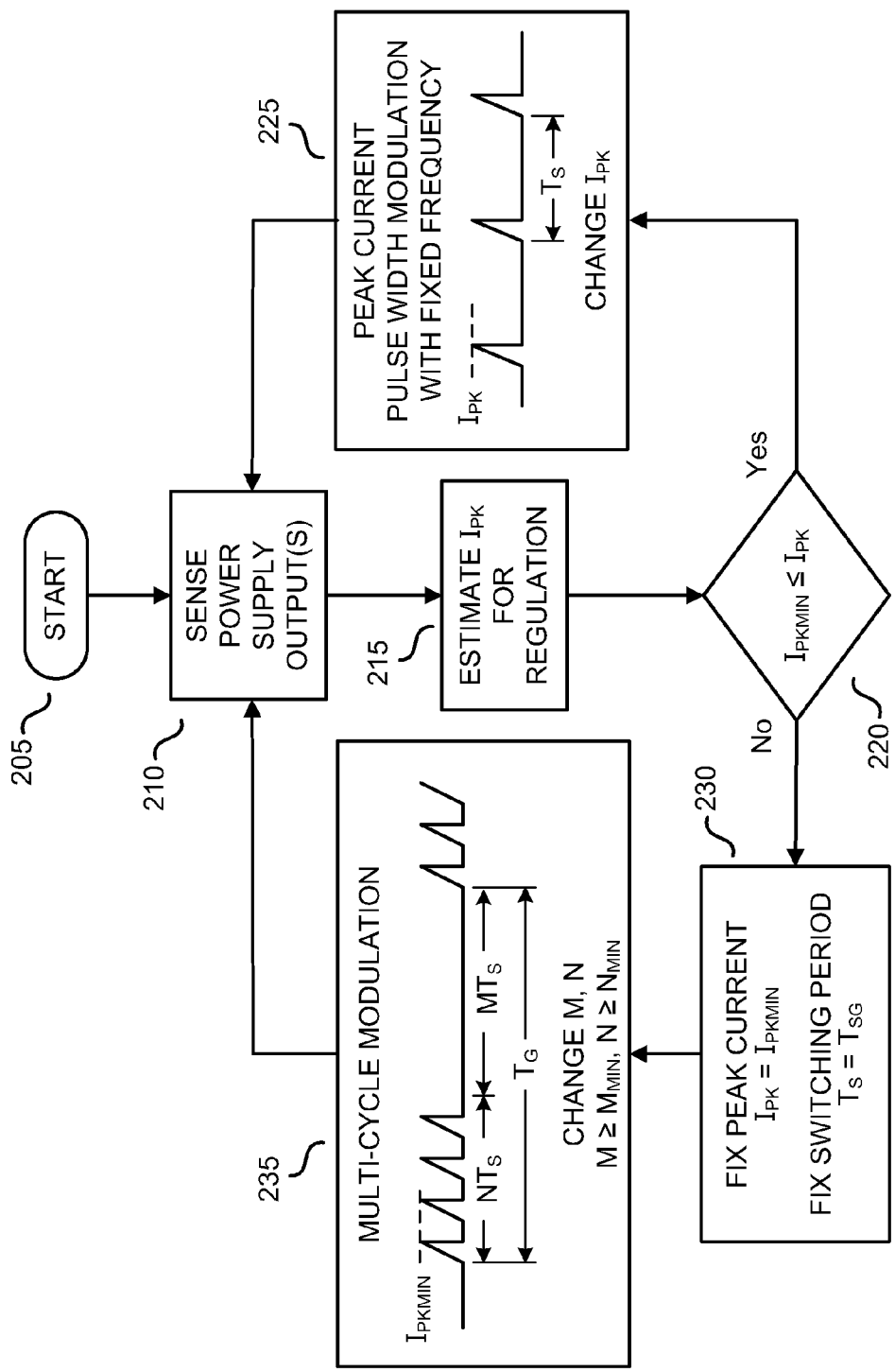
FIG. 2 is an example flow diagram illustrating generally a sample flow of operations of an example switching power supply providing power to a load in accordance with the teachings of the present invention

FIG. 2 is an example flow diagram that describes generally a method to control a power supply according to the teachings of the present invention. Starting in block 205, sensing of power supply output(s) occurs at block 210.

Next, in block 215, the controller uses information sensed from the power supply output(s) to estimate the peak current $I_{PK}$ required to regulate the output with a fixed switching cycle period $T_S$. Next, the estimate of peak current $I_{PK}$ is compared to a minimum peak current $I_{PKMIN}$ at a decision block 220. In one example, the minimum peak current $I_{PKMIN}$ corresponds to a light load that requires a reduction in average switching frequency to reduce switching losses.

The estimate of peak current $I_{PK}$ and comparison to the minimum peak current $I_{PKMIN}$ do not need to be precise or the result of numerical computation. In one example, the peak current $I_{PK}$ is estimated from the magnitude of a feedback signal. The premise of the estimate in one example is that a large feedback signal implies a light load that demands a switching frequency within the range of audio frequencies, which can cause objectionable levels of audible noise, to meet the requirements of high efficiency. Under those conditions, decision block 220 finds that $I_{PKMIN} > I_{PK}$, and the flow is directed to block 230. Peak current $I_{PK}$ is fixed at the value $I_{PKMIN}$ and the period of the switching cycle $T_S$ is fixed at the value $T_{SG}$ in block 230. Regulation is then accomplished with multi-cycle modulation in a block 235.

As shown in block 235, multi-cycle modulation accomplishes regulation of the output by gathering N periods of switching in the switch signal, each having period $T_{SG}$, followed by no switching for M periods of $T_{SG}$. In the example, N and M are modulated, restricted respectively to minimum values $N_{MIN}$ and $M_{MIN}$. The resulting pattern of switching and no switching in the switch signal gives the same average current $I_D$ 115 in FIG. 1A which has an uninterrupted switching at a fixed switching cycle period that corresponds to a higher switching frequency that would produce greater switching loss and reduced efficiency. In the example, the pattern of switching with multi-cycle modulation in accordance with the teachings of the present invention generates substantially less audio noise than an ungrouped pattern with ordinary peak current pulse width modulation.

If the decision block 220 finds that $I_{PKMIN} \leq I_{PK}$, then the flow is directed to a block 225 so that regulation is accomplished with peak current PWM at fixed switching frequency instead of multi-cycle modulation. In one embodiment, $I_{PKMIN}$ is set at approximately 25% of the peak current at maximum output power of the power supply. In one embodiment, the fixed switching frequency is 30 kHz. In one example, multi-cycle modulation may be used to regulate the delivery of low output power and fixed frequency peak current PWM also known as fixed frequency peak current mode control may be used to regulate the delivery of higher output power in accordance with the teachings of the present invention.

Thus, in one example, dependent upon the relationship between peak switch current $I_{PK}$ and minimum peak switch current $I_{PKMIN}$, the switch may be controlled to conduct according to a first or a second operating mode. In the first operating mode, a switch is controlled to conduct within a fixed period of the switching cycle and the peak switch current within the fixed period of the switching cycle is adjusted to regulate the output of a power supply. Alternatively, in a second operating mode, the switch may be controlled to conduct within a switching cycle having a fixed period, one group of consecutive switching cycles separated from a next group of consecutive switching cycles by a time of no switching, the time of no switching is adjusted to regulate the output of the power supply. In the example, the time of no switching may be adjusted so that the frequency of the switching cycle falls outside an audible frequency range. In the example, the group of switching cycles includes at least two consecutive switching cycles.

In one example, the fixed frequency voltage mode PWM could be used instead of peak current mode PWM to regulate delivery of higher power in accordance with the teachings of the present invention. In this example, the decision to use PWM versus multi-cycle modulation would be based on the on time of the switch rather than peak current that is needed to keep the output in regulation. For example, when the on time decreases in response to the feedback signal and crosses a threshold that would indicate a light load, the operation is changed from fixed frequency voltage mode PWM to multi-cycle modulation.

Figure 3B:
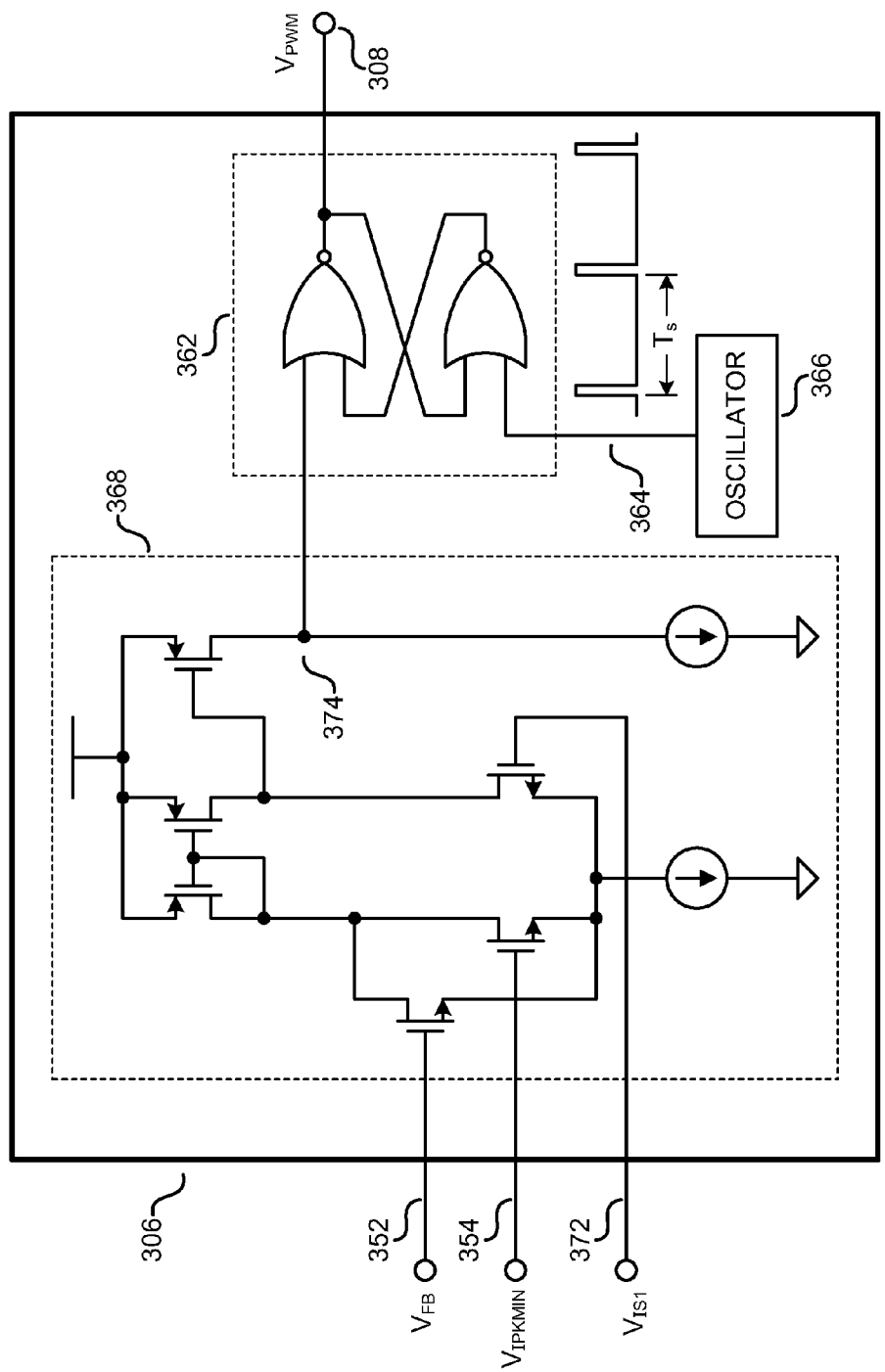
FIG. 3B is an example schematic illustrating generally a fixed frequency peak current PWM modulator and a selector comparator circuit that selects modes of operation in accordance with the teachings of the present invention.

FIG. 3A illustrates generally an example schematic 345 of a multi-cycle modulator 340 included in a controller for a power supply that uses the method illustrated in FIG. 2. In the example, a feedback control block 302 is coupled to receive a sense signal 350 that is related to the output(s) of the power supply. Sense signal 350 may represent a combination of one or more parameters such as output voltage, output current, current in the switch, timing of the switch, power supply input voltage, enable signals, inhibit signals, or the like, that occur within a certain time. The sense signal 350 could be analog or digital in nature. In response to the sense signal 350, the feedback control block 302 produces a feedback current $I_{FB}$ 356 that corresponds to a peak switching current required to maintain a regulated output. Current $I_{FB}$ is converted to a voltage $V_{FB}$ 352 by a resistor R1 358. A fixed current, proportional to a minimum peak switch current $I_{PKMIN}$, is likewise converted to a fixed reference voltage $V_{IPKMIN}$ 354 by a resistor R2 360. The voltage $V_{FB}$ 352 and the fixed reference voltage $V_{IPKMIN}$ 354 are received by a modulation block 306 to produce a pulse width modulated switching signal 308 with fixed switching frequency corresponding to a fixed switching cycle period $T_S$ at a first input to an AND gate 310. In one example, block 306 changes the pulse width of switching signal 308 by adjusting the peak current $I_{PK}$ in a switch S1 120 of the power supply. Current in the switch S1 120 is converted to a current sense voltage $V_{ISI}$ 372 by a current sensing resistor Rs 370. Current sense voltage $V_{ISI}$ 372 is received by block 306. In one example, the peak current $I_{PK}$ is proportional to the feedback current $I_{FB}$ 356 when the feedback current $I_{FB}$ 356 is greater than a minimum reference peak switch current $I_{PKMIN}$, and peak current $I_{PK}$ is fixed at the value $I_{PKMIN}$ when the feedback current is less than $I_{PKMIN}$. One example of a circuit that performs the function of block 306 is shown in FIG. 3B and described later in this disclosure. A comparator 314 compares voltage $V_{FB}$ 352 to a reference voltage $V_{IPKMIN}$ 354. In the example of FIG. 3A, the output of comparator 314 is received as signal 316 by a multi-cycle modulator circuit 340 at the input of an inverter 320 and to a first input of a NAND gate 324. As shown in the example, multi-cycle modulator circuit 340 generates signal 332, which enables or disables the switch signal 312 at the output of AND gate 310 in response to the signal 316 from comparator 314. Signal 316 from comparator 314 is high when voltage $V_{FB}$ 352 is greater than reference voltage $V_{IPKMIN}$ 354. Signal 316 from comparator 314 is low when voltage $V_{FB}$ 352 is less than reference voltage $V_{IPKMIN}$ 354. When signal 316 is high, multi-cycle modulator circuit 340 sets a signal 332 high at a second input to AND gate 310, thereby enabling or permitting the pulse width modulated switching signal 308 from block 306 to appear uninterrupted at the output of AND gate 310, which in the illustrated example is also a switch signal 312 that is coupled to a switch S1 120. In one example, switch S1 120 is a power metal oxide field effect transistor (MOSFET). When signal 332 is low at the second input to AND gate 310, the pulse width modulated switching signal 308 is disabled or not permitted to appear at the output of AND gate 310.

When signal 316 is low, period $T_S$ is fixed at a value of $T_{SG}$. Also, when signal 316 is low, the multi-cycle modulator circuit 340 allows switching signal 308 to appear at switch signal 312 for a minimum number $N_{MIN}$ of switching cycles, each having period $T_{SG}$, and disables switch signal 312 for a minimum number $M_{MIN}$ of switching cycles, each having period $T_{SG}$. In one example, multi-cycle modulator circuit 340 includes a latch coupled to receive signal 316 from the output of comparator 314. As shown in the example, the latch is formed with NAND gates 326 and 328, and inverters 320 and 330 and is coupled to an edge detector 348, which is coupled to a one-shot timer 338. Edge detector 348 includes an XOR gate 342, inverter 344 and delay 346 as shown.

In one example, edge detector 348 produces logic low on line 336 for approximately 30 nanoseconds when signal 332 from the output of inverter 330 of the latch changes from high to low and from low to high. When line 336 goes low, one-shot timer 338 produces a logic low on line 334 for a duration of either $N_{MIN}T_{SG}$ or $M_{MIN}T_{SG}$. The duration of the logic low on line 334 is $N_{MIN}T_{SG}$ when line 332 is high. The duration of the logic low on line 334 is $M_{MIN}T_{SG}$ when line 332 is low. In one embodiment, $N_{MIN}$ is chosen to be approximately 4 cycles and $M_{MIN}$ to be zero cycles. In one embodiment, the frequency corresponding to fixed period $T_{SG}$ is 30 kHz.

FIG. 3B shows one example of a circuit that performs the function of block 306 in of FIG. 3A, which includes a fixed frequency peak current modulator and a mode selector comparator. Mode select comparator 368 receives voltages $V_{FB}$ 352, $V_{IPKMIN}$ 354, and $V_{ISI}$ 372. Mode select comparator 368 produces an output 374 that is received by one input of a latch 362. Another input of latch 362 receives a timing signal 364 from an oscillator 366. The output of latch 362 is the pulse width modulated switch signal 308.

Figure 4:
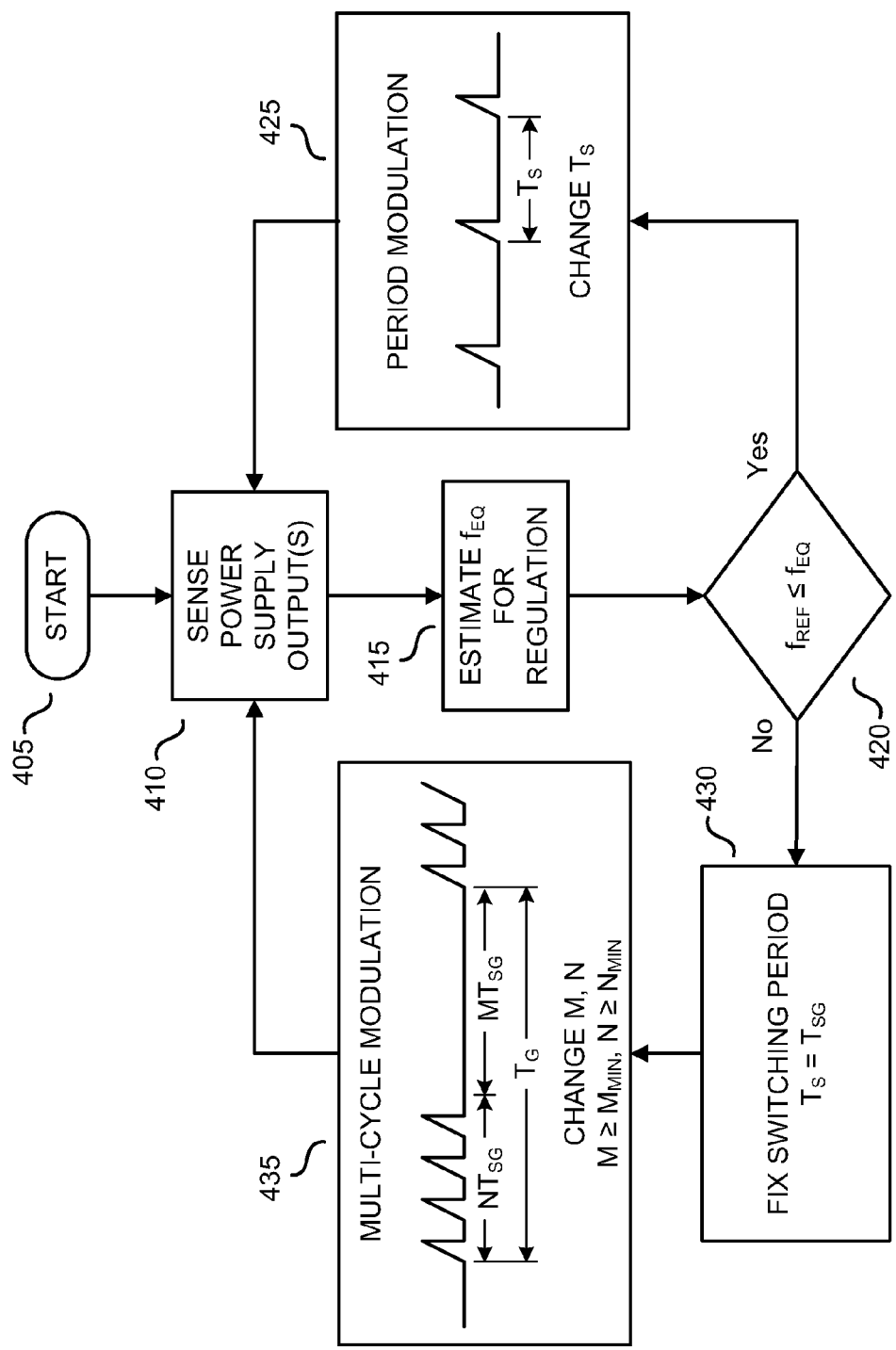
FIG. 4 is another example flow diagram illustrating generally a sample flow of operations of an example switching power supply providing power to a load in accordance with the teachings of the present invention

FIG. 4 is another example flow diagram that describes generally another method to control a power supply according to the teachings of the present invention. Starting in block 405, sensing of power supply output(s) occurs at block 410.

Next, in block 415, the controller uses information sensed from the power supply output(s) to estimate an equivalent switching frequency $f_{EQ}$ required to regulate the output with period modulation. Next, the estimate of switching frequency $f_{EQ}$ is compared to a reference frequency $f_{REF}$ at a decision block 420. In one example, the reference frequency $f_{REF}$ is greater than or equal to the highest audio frequency of interest. In one embodiment, the reference frequency is approximately 30 kHz.

The estimate of switching frequency $f_{EQ}$ and comparison to reference frequency $f_{REF}$ do not need to be precise or the result of numerical computation. In one example, switching frequency $f_{EQ}$ is estimated to be higher or lower than reference frequency $f_{REF}$ on the basis of a feedback signal. An estimate of $f_{EQ}$ lower than $f_{REF}$ implies a light load that demands a switching frequency within the range of audio frequencies. Under those conditions, decision block 420 finds that $f_{REF} > f_{EQ}$, and the flow is directed to block 430. Period $T_S$ is fixed at the value $T_{SG}$ in block 430. Regulation is then accomplished with multi-cycle modulation in a block 435.

As shown in block 435, multi-cycle modulation accomplishes regulation of the output by gathering N cycles of switching in the switch signal, each having period $T_{SG}$, followed by no switching for M cycles of period $T_{SG}$. In the example, N and M are modulated, restricted respectively to minimum values $N_{MIN}$ and $M_{MIN}$. The resulting pattern of switching and no switching in the switch signal gives the same average current $I_D$ 115 in FIG. 1A as uninterrupted switching at switching frequency $f_{EQ}$ with a fixed switching cycle period. In the example, the pattern of switching with group modulation generates substantially less audio noise than an ungrouped pattern with ordinary period modulation in accordance with the teachings of the present invention.

If the decision block 420 finds that $f_{REF} \leq f_{EQ}$, then the flow is directed to a block 425 so that regulation is accomplished with period modulation instead of multi-cycle modulation. In one embodiment, the period modulation frequency range is 30 kHz to 66 kHz. In another embodiment, period modulation frequency range is 30 kHz to 132 kHz. In one example, multi-cycle modulation may be used to regulate the delivery of low output power and period modulation may be used to regulate the delivery of higher output power in accordance with the teachings of the present invention.

Thus, in one example, dependent upon the relationship between switching frequency $f_{EQ}$ and reference frequency $f_{REF}$, the switch may be controlled to conduct according to a first or a second operating mode. In one operating mode, a switch is controlled to conduct within a switching cycle and the period of the switching cycle is adjusted to regulate the output of a power supply. Alternatively, in a second operating mode, the switch may be controlled to conduct within a switching cycle having a fixed period, one group of consecutive switching cycles separated from a next group of consecutive switching cycles by a time of no switching, the time of no switching is adjusted to regulate the output of the power supply. In the example, the time of no switching may be adjusted so that the frequency corresponding to the period of a switching cycle falls outside an audible frequency range. In the example, the group of switching cycles includes at least four consecutive switching cycles.

Figure 5:
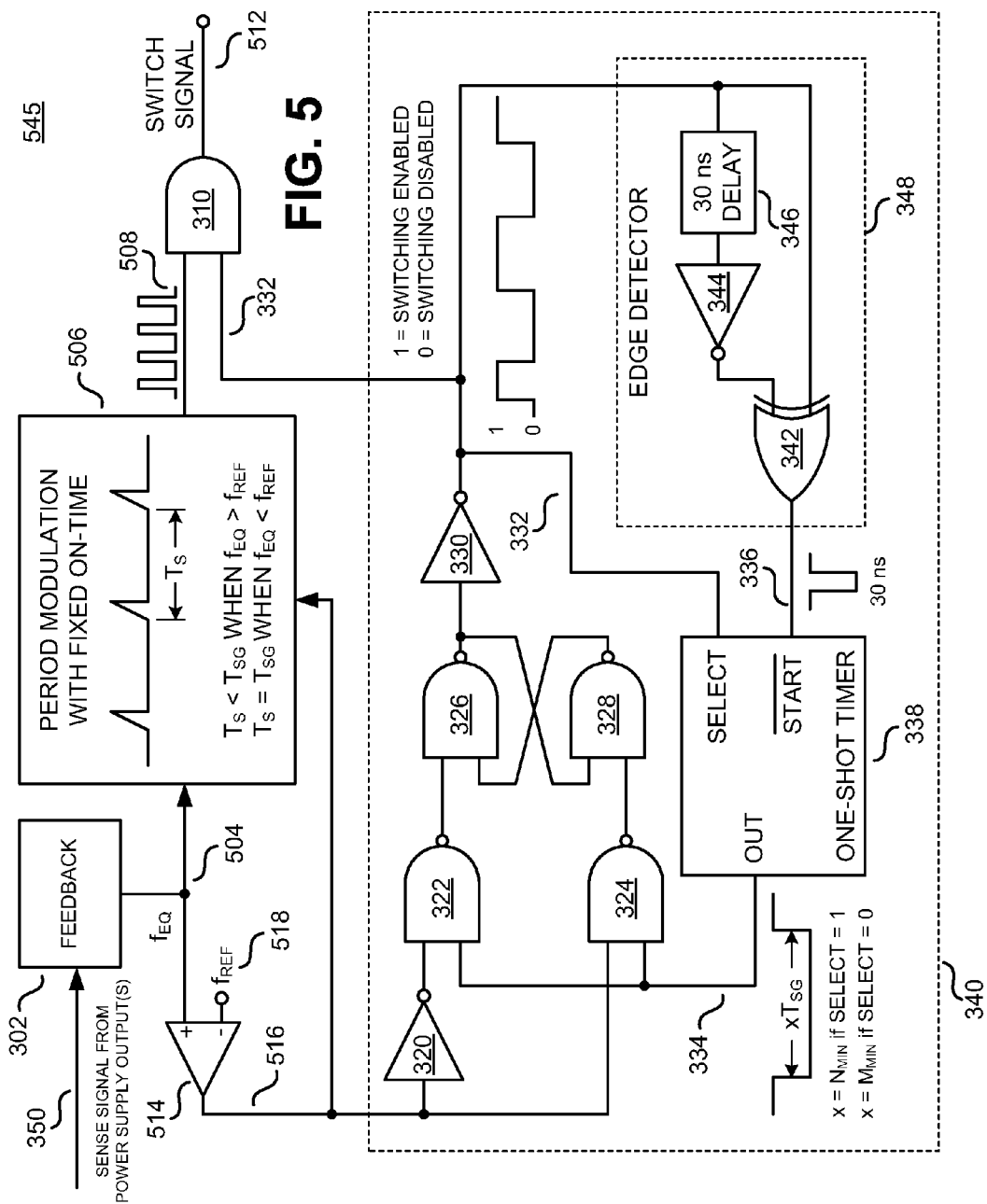
FIG. 5 is another example schematic illustrating generally an example controller of an example switching power supply providing power to a load in accordance with the teachings of the present invention.

FIG. 5 illustrates generally an example schematic of a controller 545 for a power supply that uses the method illustrated in FIG. 4. In the example, a feedback control block 302 is coupled to receive a sense signal 350 that is related to the output(s) of the power supply. As discussed the sense signal 350 may represent a combination of one or more parameters such as output voltage, output current, output power, current in the switch, timing of the switch, power supply input voltage, enable signals, inhibit signals, or the like, that occur within a certain time. The sense signal 350 could be analog or digital in nature. In response to the sense signal 350, the feedback control block 302 produces an equivalent switching frequency signal $f_{EQ}$ 504 that corresponds to a switching frequency required to maintain a regulated output. The signal $f_{EQ}$ 504 is received by a period modulation block 506 to produce a period modulation switching signal 508 with period Ts at a first input to an AND gate 310. A comparator 514 compares signal $f_{EQ}$ 504 to a reference signal $f_{REF}$ 518, which in one example corresponds to a minimum switching frequency desired for period modulated switching. In the example of FIG. 5, the output of comparator 514 is received as signal 516 by a multi-cycle modulator circuit 340 at the input of an inverter 320 and to a first input of a NAND gate 324. As shown in the example, multi-cycle modulator circuit 340 generates signal 332, which enables or disables the switch signal 512 at the output of AND gate 310 in response to the signal 516 from comparator 514. Signal 516 from comparator 514 is high when signal $f_{EQ}$ 504 is greater than reference signal $f_{REF}$ 518. Signal 516 from comparator 514 is low when signal $f_{EQ}$ 504 is less than reference signal $f_{REF}$ 518. When signal 516 is high, multi-cycle modulator circuit 340 sets a signal 332 high at a second input to AND gate 310, thereby enabling or permitting the period modulation switching signal 508 from period modulation block 506 to appear uninterrupted at the output of AND gate 310, which in the illustrated example is also a switch signal 512. When signal 332 is low at the second input to AND gate 310, the period modulation switching signal 508 is disabled or not permitted to be appear at the output of AND gate 310.

When signal 516 is low, multi-cycle modulator circuit 340 allows switching signal 508 to appear at switch signal 512 for a minimum number $N_{MIN}$ of group switching cycles with period $T_{SG}$, and disables switch signal 512 for a minimum number $M_{MIN}$ of group switching cycles with period $T_{SG}$. In one example, multi-cycle modulator circuit 340 includes a latch coupled to receive signal 516 from the output of comparator 514. As shown in the example, the latch is formed with NAND gates 326 and 328, and inverters 320 and 330 and is coupled to an edge detector 348, which is coupled to a one-shot timer 338. Edge detector 348 includes an XOR gate 342, inverter 344 and delay 346 as shown.

In one example, edge detector 348 produces logic low on line 336 for approximately 30 nanoseconds when signal 332 from the output of inverter 330 of the latch changes from high to low and from low to high. When line 336 goes low, one-shot timer 338 produces a logic low on line 334 for a duration of either $N_{MIN}T_{SG}$ or $M_{MIN}T_{SG}$. The duration of the logic low on line 334 is $N_{MIN}T_{SG}$ when line 332 is high. The duration of the logic low on line 334 is $M_{MIN}T_{SG}$ when line 332 is low.

In yet another example, a different parameter other than a peak switch current $I_{PK}$ or an equivalent switching frequency $f_{EQ}$ could be taken as the criterion to choose between multi-cycle modulation and an alternative mode of control. For example, the alternative mode of control may be a fixed switching frequency voltage mode PWM. In this mode on time of the switch is modulated as long as on time is above certain threshold in response to feedback signal. When the feedback signal demands an on time that is below a minimum threshold value representing a light load condition, the on time could be fixed at this value and the mode of control can be switched to multi-cycle modulation. Yet another alternative mode of control may be a variable frequency with a fixed on-time or a fixed off-time that uses a minimum switching frequency as an indication for multi-cycle modulation.

Accordingly, in one example, a controller is coupled to a switch in a power supply to control the switch to switch on and off within a switching cycle. In the example, the switch is coupled to an energy transfer element such as energy transfer element T1 125 of the power supply. The group of switching cycles is separated from a next group of switching cycles by a time of no switching and the time of no switching is adjusted to regulate a transfer of energy from an input of the power supply to an output of the power supply. In the example, the minimum number of consecutive cycles in a group of switching cycles is fixed. Furthermore, the controller may operate under an additional operating mode to regulate a higher output of power by controlling the switch to conduct within a switching cycle and adjusting the period of the cycle to regulate the output. To illustrate, FIG. 6, FIG. 7, FIG. 8, and FIG. 9 show generally relationships between patterns of switching cycles and the generation of frequencies that can produce audio noise to enable selection of values for the parameters for multi-cycle modulation in accordance with teachings of the present invention.

Current $I_D$ 115 produces a magnetic flux density B in the energy transfer element T1 125 (See FIG. 1). FIG. 6A is a graph showing one example of a typical waveform of magnetic flux density B as a function of time. A peak flux density $B_P$ occurs at the peak current $I_{MAX}$ of the current $I_D$ 115. The magnetic flux density B is active for a time $T_A$ within period $T_S$.

It is important to consider the spectral content of magnetic flux density B because the magnetic flux density produces mechanical forces that change the shape of energy transfer element T1 125. If magnetic flux density B contains frequency components within the range of audio frequencies that can cause the energy transfer element T1 125 to resonate, it can generate objectionably high audio noise.

FIG. 6B and FIG. 6C show partial frequency spectra of the waveform in FIG. 6A. Spectra from a high switching frequency are shown in FIG. 6B, whereas spectra from a low switching frequency are in shown in FIG. 6C on the same frequency scale.

The vertical lines on the frequency axes show the relative magnitudes of coefficients in the complex Fourier series representation of the waveform in FIG. 6A. One skilled in the art will recall that a periodic function f(t) with period $T_O$ may be represented as $$f(t) = \sum_{n=-\infty}^{\infty} c_n e^{jn\omega_0 t} = c_0 + \sum_{n=1}^{\infty} 2|c_n|\cos(n\omega_0 t + \phi_n)$$

where $$j = \sqrt{-1} \text{ and } \omega_0 = \frac{2\pi}{T_0}$$

The coefficients $c_n$ are in general complex numbers that have a real part and an imaginary part. Although real and imaginary parts must be used for correct computations, only the magnitudes of the coefficients $c_n$ need be considered to explain and understand the invention.

In FIG. 6B and FIG. 6C it is not necessary to show the relative magnitudes of the coefficients $c_n$ for n<0 because the magnitudes at the negative frequencies are the same as those at the positive frequencies.

$$|c_n| = |c_{-n}| \text{ for } n=1,2,\ldots$$

The average of the magnetic flux density B in FIG. 6A is the coefficient $c_O$, and is represented by the line at zero frequency in FIG. 6B and FIG. 6C. The coefficient of the fundamental frequency $f_S$ that corresponds to the period $T_S$ is represented by the line at frequency $f_S$ in FIG. 6B and FIG. 6C. The magnitudes of harmonics of the fundamental frequency are shown as lines at integer multiples of the fundamental frequency.

The force that produces mechanical distortion in a typical energy transfer element, such as a ferrite core transformer, to cause the production of audio noise is proportional to the square of the magnetic flux density. It is useful to display the magnitudes of the coefficients because the power at each frequency is also represented by the square of the magnitudes. Therefore, it is desirable to reduce the magnitude of all coefficients within the range of audio frequencies.

To illustrate, FIG. 6B and FIG. 6C show a range of frequencies between a lower boundary $f_{XMIN}$ and an upper boundary $f_{XMAX}$ where it is desired to reduce or exclude all excitation from the magnetic flux density in FIG. 6A. In one example, $f_{XMIN}$ and $f_{XMAX}$ are respectively the lower and upper boundaries of the range of audio frequencies that corresponds to the range of resonance frequencies of components such as transformers and ceramic capacitors that are commonly used in switching power supplies. In one embodiment, the typical value of $f_{XMIN}$ is 8 kHz and that of $f_{XMAX}$ is 15 kHz.

At the high switching frequency that produces the spectrum of FIG. 6B, there are no spectral components in the region between $f_{XMIN}$ and $f_{XMAX}$. As the period $T_S$ is increased and the switching frequency goes lower to regulate an output, the fundamental component at fundamental frequency $f_S$ and all the harmonic multiples of fundamental frequency $f_S$ move closer to zero on the frequency axis. In the example of FIG. 6C, the fundamental component of the switching frequency has moved from a value greater than $f_{XMAX}$ into the exclusion region between $f_{XMIN}$ and $f_{XMAX}$, which could cause, for example, the transformer to resonate.

It is possible to rearrange the active times $T_A$ of the waveform of the magnetic flux density in FIG. 6A to reduce the power contained in the region between $f_{XMIN}$ and $f_{XMAX}$ while maintaining the same average value required to regulate the output. One example of a suitable rearrangement is shown in FIG. 7A with its frequency spectrum in FIG. 7B.

Figure 7A:
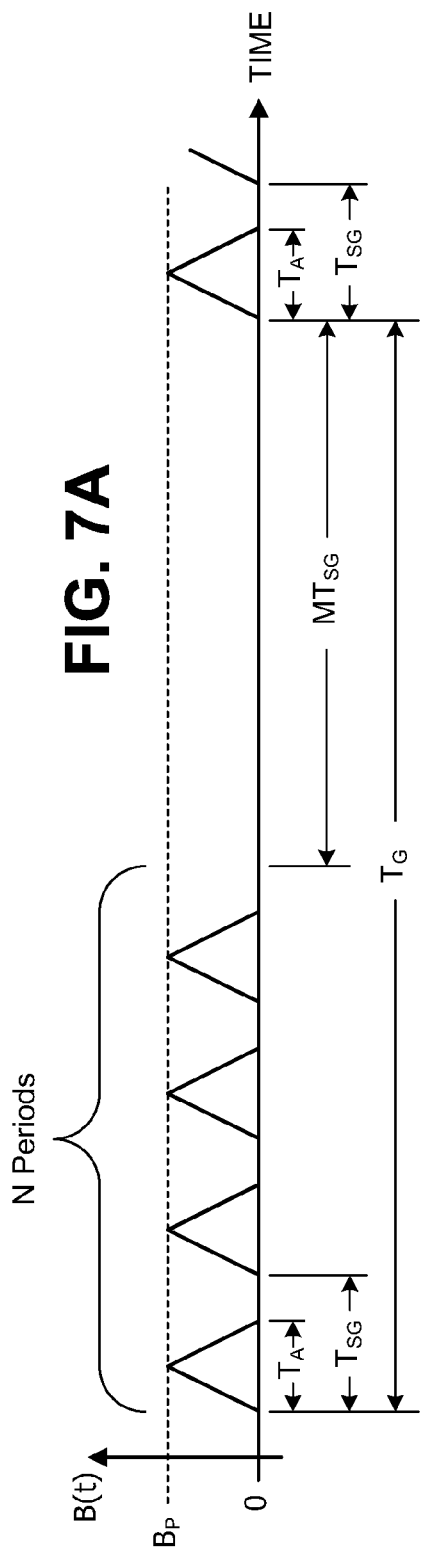
FIG. 7A is a diagram illustrating generally an example of magnetic flux density in an energy transfer element of a switching power supply operating in a multi-cycle modulation mode in accordance with the teachings of the present invention.

FIG. 7A shows a group of N switching cycle periods or N periods at a switching frequency $f_{SG}$ with corresponding period $T_{SG}$, followed by a time of no switching. The time of no switching is a multiple M of the period $T_{SG}$. The multiplication factor M is adjusted to keep the same average magnetic flux density as the waveform of FIG. 6A that would be obtained with an equivalent switching frequency $f_{EQ}$. The group period $T_G$ is the sum of the N periods $T_{SG}$ and the time of no switching. Thus, to regulate an output, the period $T_{SG}$ is unchanged while the group period $T_G$ is adjusted.

In this description we refer to the adjustment of the period $T_S$ of a switching cycle in FIG. 6A as period modulation. We refer to the adjustment of the group period $T_G$ in FIG. 7A as multi-cycle modulation.

Figure 7B:
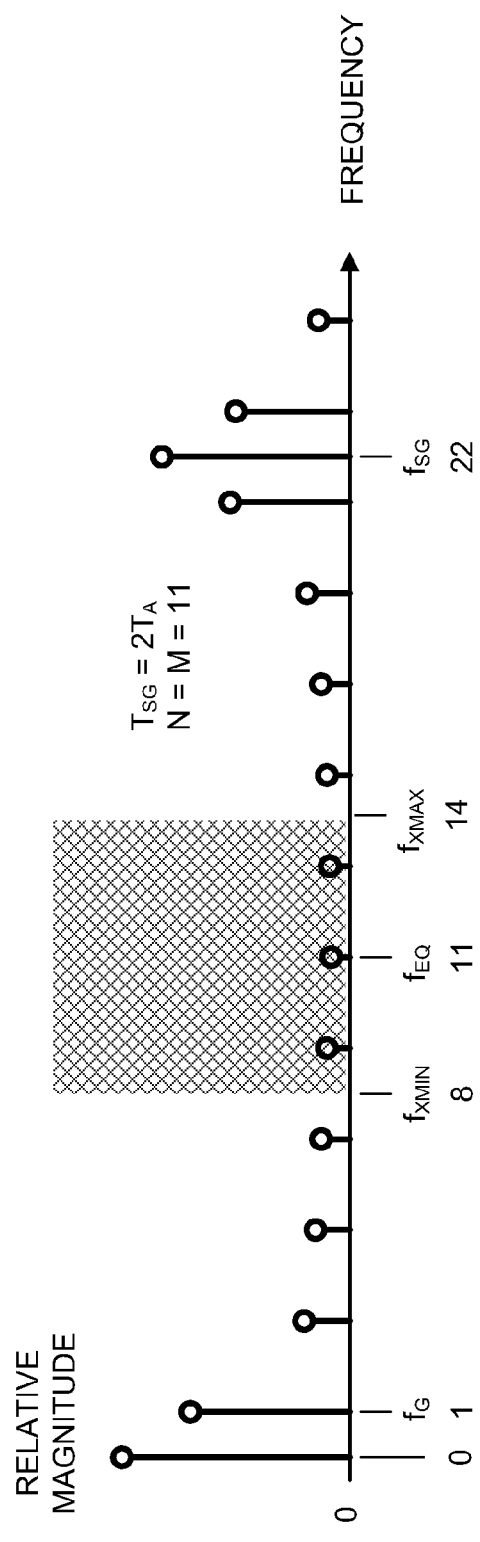
FIG. 7B is a diagram illustrating generally an example of partial frequency spectra in an energy transfer element of a switching power supply operating in a multi-cycle modulation mode in accordance with the teachings of the present invention.

FIG. 7B shows an example spectrum drawn to scale of the group modulated magnetic flux density of FIG. 7A for the conditions of N=M=11 and $T_{SG}=2T_A$. FIG. 6C shows the spectrum with period modulated magnetic flux density that produces the same output power as the spectrum in FIG. 7B with group modulated magnetic flux density. The switching frequency or frequency $f_S$ in FIG. 6C is the equivalent frequency $f_{EQ}$ in FIG. 7B. Comparison of the spectra in FIG. 6C and FIG. 7B shows that multi-cycle modulation greatly reduces the power within the exclusion range between $f_{XMIN}$ and $f_{XMAX}$. The total power within a range of frequencies is represented by the sum of the squares of the magnitudes within the range.

Figure 8A:
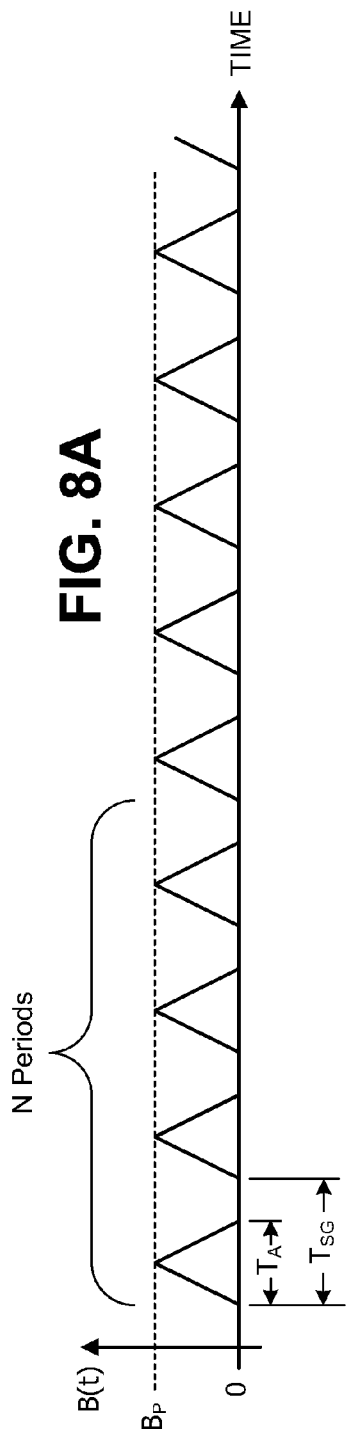
FIG. 8A is a diagram illustrating generally an example of an unmodulated magnetic flux density signal in an energy transfer element of a switching power supply in accordance with the teachings of the present invention.
Figure 8B:
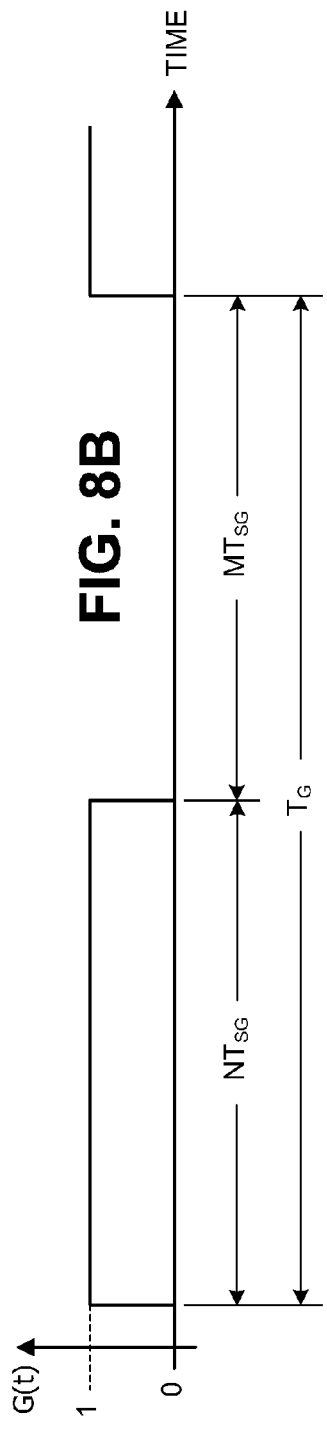
FIG. 8B is a diagram illustrating generally an example of a multi-cycle modulator signal of a switching power supply in accordance with the teachings of the present invention.

To further illustrate, the multi-cycle modulated magnetic flux density of FIG. 7A can be viewed as the unmodulated signal in FIG. 8A multiplied by the multi-cycle modulator signal of FIG. 8B. Design parameters for multi-cycle modulation can be determined by examination of the spectra of the two signals.

Figure 8C:
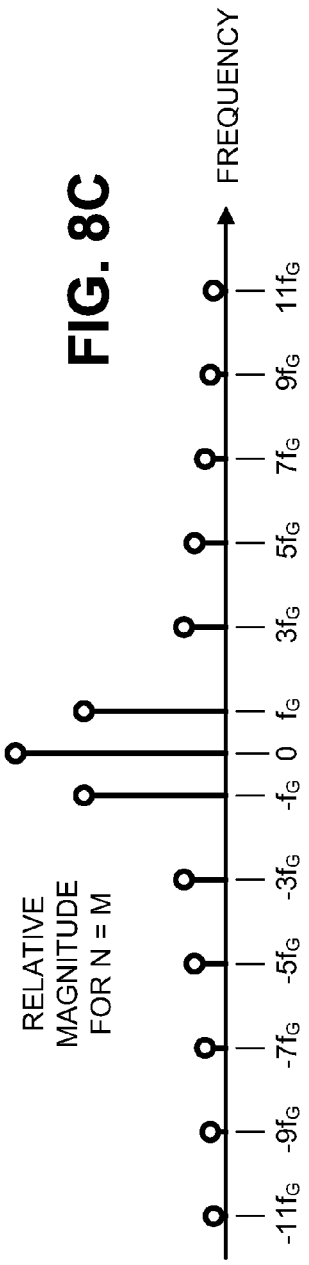
FIG. 8C is a diagram illustrating generally an example relative magnitudes of the coefficients for positive and negative frequencies in a complex Fourier series representation of a multi-cycle modulator signal in accordance with the teachings of the present invention.

FIG. 8C shows the relative magnitudes of the coefficients for positive and negative frequencies in the complex Fourier series representation of the multi-cycle modulator signal of FIG. 8B. The case of N=M is taken for ease of illustration since the even numbered harmonics are zero. One skilled in the art can easily determine the coefficients for any values of N and M.

Figure 9:
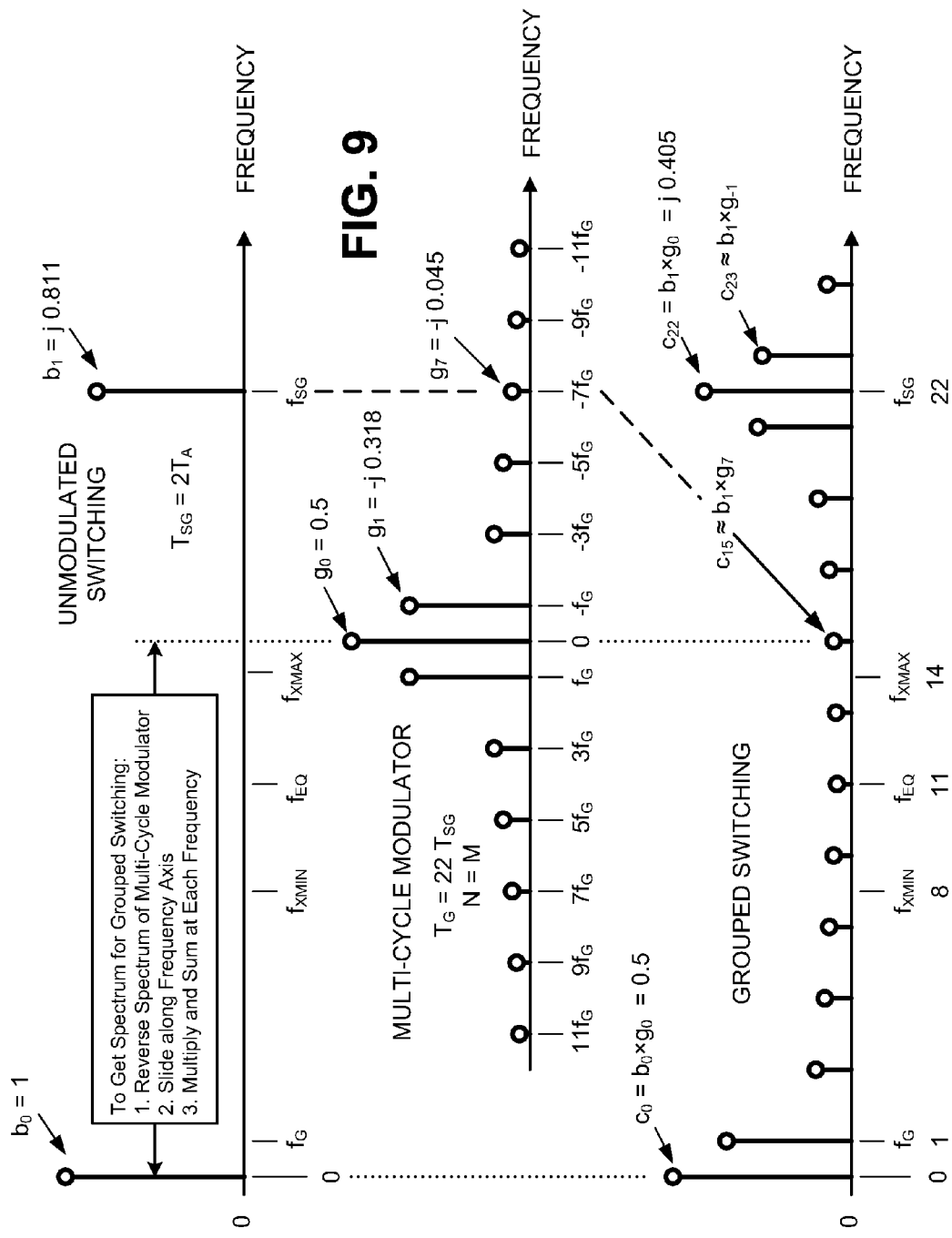
FIG. 9 is a diagram illustrating generally how an example unmodulated switching signal and an example spectrum of a multi-cycle modulator signal are combined to produce an example spectrum of a multi-cycle modulated signal in accordance with the teachings of the present invention.

FIG. 9 shows how the spectrum of the unmodulated switching signal of FIG. 8A and the spectrum of the multi-cycle modulator signal of FIG. 8B are combined to produce the spectrum of the multi-cycle modulated signal of FIG. 7A. One skilled in the art will recall that the multiplication of two signals in the time domain is equivalent to the convolution in the frequency domain. That is, the multiplication of the unmodulated magnetic flux density signal B(t) and the group modulator signal G(t) produces the group modulated signal C(t) that has the spectrum c(f) such that $$c(f)=\int_{-\infty}^{\infty}b(x)g(f-x)dx$$

where b(f), g(f), and c(f) are the spectra of B(t), G(t), and C(t) respectively, and x is a dummy variable of integration along the frequency axis.

The convolution operation is easily interpreted and performed graphically, especially when the spectra are nonzero at only discrete frequencies. To perform the graphical convolution, first flip or reverse the spectrum of the group modulator about the zero frequency axis so that frequencies get more positive to the left and more negative to the right. Although the reversed spectrum of magnitudes is identical to the original spectrum because of symmetry, the reversal is necessary for correct numerical computations that require the proper signs in the coefficients.

In FIG. 9, the positive frequency portion of the spectrum of the unmodulated switching waveform is shown for the case of $T_{SG}=2T_A$. Only the coefficient at zero frequency and the fundamental frequency are shown because the higher harmonics are much greater than the highest frequency of interest. A graphical procedure may be used to obtain the magnitude of the spectrum of the multi-cycle modulated switching waveform at any frequency of interest. To obtain the coefficients for the spectrum of the multi-cycle modulated switching waveform graphically, slide the reversed spectrum of the multi-cycle modulator along the frequency axis such that the zero of the multi-cycle modulator spectrum is at the frequency of interest. Then multiply each coefficient in the multi-cycle modulator spectrum by the coefficient of the unmodulated spectrum that aligns with it. Sum all the products to obtain the value of the coefficient for the multi-cycle switching spectrum at the frequency of interest.

Although the spectrum of the multi-cycle modulator contains an infinite number of coefficients, only the most significant need to be considered to obtain a good approximation of the multi-cycle switching spectrum. In most practical cases, all coefficients beyond the first three or four can be ignored. The example in FIG. 9 shows that the magnitude of the coefficient $c_{15}$ in the multi-cycle modulated switching spectrum is approximately the product of the magnitude of the coefficient $b_1$ of the unmodulated switching signal and the magnitude of the coefficient $g_7$ of the multi-cycle modulator. The value is approximate because the products of all higher harmonics are ignored. In the example of FIG. 9, the coefficients at the even numbered frequencies are exact because the sum contains only one term that is not zero.

Study of FIG. 9 yields relationships to guide the selection of parameters for group modulation. With the region of excluded frequencies determined by $f_{XMIN}$ and $f_{XMAX}$, where $f_{XMIN}<f_{XMAX}$, the group switching frequency $f_{SG}$ is chosen such that $$f_{SG} \geq f_{XMIN} + f_{XMAX}$$

determines the highest significant frequency in the spectrum of the multi-cycle modulator as a multiplier W of the fundamental frequency $f_G$ such that all frequencies greater than W multiplied by $f_G$ should be negligible in the convolution that determines the coefficients in the region of excluded frequencies. Typically, only the first two or three harmonics of $f_G$ will have any real significance, so the multiplier W is usually not greater than 2 or 3. Then $$N \geq W \frac{f_{XMAX}}{f_{XMIN}}$$

optimum values are the lowest required for sufficient reduction in the region of excluded frequencies.

For an equivalent frequency $f_{EQ}$ that produces the same output power with multi-cycle modulation as with period modulation, the modulation multiplier M must be $$M = N\left(\frac{f_{SG}}{f_{EQ}} - 1\right)$$

corresponding to a multi-cycle group frequency $$f_G = \frac{f_{EQ}}{N}$$

In examples where the time between groups must be an integer multiple of $T_{SG}$, the correct value of M is satisfied as an average over several group periods with different integer values of M. In one design, it may be desired to set a minimum integer value of M such that M≦N. Since M is minimum when $f_{EQ}=f_{XMAX}$, choose $f_{SG}=2f_{XMAX}$. With the constraint of minimum M, a choice of W=3 is usually valid for all M. As an example, a typical design to reduce frequencies in the audio range between $f_{XMIN}$ of 8 kHz and $f_{XMAX}$ of 15 kHz where a transformer is likely have mechanical resonances may use $f_{SG}$=30 kHz. A choice of W=3 would give N≧5.625 so N=M=6. Regulation with group modulation would group together a minimum of six periods of consecutive switching followed by a minimum of six periods of no switching.

Thus, in one example, a switch in a switching power supply is controlled to switch on and off within a switching cycle of substantially fixed period. At least one group of switching cycles is separated from a next group of switching cycles by a time of no switching and the time of no switching is adjusted to regulate an output of the switching power supply. In the example, the time of no switching may be adjusted to a time that is an integer multiple of the substantially fixed period of the switching cycle. Additionally, the time of no switching may be at least as long as the group of switching cycles.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible, as those skilled in the relevant art will recognize. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. A controller for use in a power supply, the controller comprising:
a switch signal generator coupled to generate a switch signal to control switching of a switch of the power supply;
a modulation circuit coupled to provide the switch signal generator with a modulation switching signal responsive to a switching frequency signal that represents an equivalent switching frequency of the switch at which an output of the power supply would be in regulation, wherein the modulation circuit modulates the period of the modulation switching signal to change the switching period of the switch signal in response to the switching frequency signal indicating that the equivalent switching frequency is greater than a reference frequency, and wherein the modulation circuit fixes the period of the modulation switching signal to fix the switching period of the switching signal in response to the switching frequency signal indicating that the equivalent switching frequency is less than the reference frequency;
a multi-cycle modulator circuit coupled to the switch signal generator, wherein the multi-cycle modulator circuit enables the switch signal generator to provide the switch signal uninterrupted in response to the switching frequency signal indicating that the equivalent switching frequency is greater than the reference frequency, and wherein the multi-cycle modulator circuit disables the switch signal generator for a first time period and then enables the switch signal generator for a second time period in response to the switching frequency signal indicating that the equivalent switching frequency is less than the reference frequency, wherein the multi-cycle modulator varies the first time period to regulate the output of the power supply.

2. The controller of claim 1, wherein the multi-cycle modulator circuit includes a timer coupled to maintain the first time period for a first minimum time period independent of the switching frequency signal.

3. The controller of claim 1, wherein the multi-cycle modulator circuit includes a timer coupled to maintain the second time period for a second minimum time period independent of the switching frequency signal.

4. The controller of claim 1, wherein the switch signal generator is an AND gate having a first input coupled to receive the modulation switching signal, a second input coupled to receive a signal from the multi-cycle modulator circuit to enable and disable the AND gate, and an output to provide the switch signal.

5. The controller of claim 1, further comprising:
   a feedback circuit to be coupled to receive a sense signal related to the output of the power supply regulator and coupled to generate the switching frequency signal in response thereto; and
   a comparator coupled to the feedback circuit to compare the switching frequency signal with a signal representative of the reference frequency, wherein the multi-cycle modulator circuit is coupled to an output of the comparator.

6. The controller of claim 5, wherein the sense signal represents a combination of one or more parameters selected from the group consisting of: output voltage of the power supply, output current of the power supply, output power of the power supply, current in the switch, timing of the switch, power supply input voltage, enable signals, inhibit signals.

7. The controller of claim 5, wherein the equivalent switching frequency being lower than the reference frequency implies a light load at the output of the power supply that demands a switching frequency within a range of audio frequencies.

8. The controller of claim 1, wherein the first time period is an integer multiple of the fixed switching period.

9. The controller of claim 8, wherein the second time period is an integer multiple of the fixed switching period.

10. The controller of claim 1, wherein the multi-cycle modulator adjusts the first time period such that a frequency of a plurality of switching cycles falls outside an audible frequency range.

11. The controller of claim 10, wherein the reference frequency is greater than or equal to a highest audio frequency of interest.

12. The controller of claim 11, wherein the reference frequency is approximately 30 kHz.

13. The controller of claim 11, wherein the modulation circuit modulates the period of the modulation switching signal to change the switching period of the switch signal such that a lower end of a frequency range of the switching signal is the highest audio frequency of interest.

14. The controller of claim 13, wherein the frequency range of the switching signal, when modulated by the modulation circuit, is about 30 kHz to about 66 kHz.

15. The controller of claim 13, wherein the frequency range of the switching signal, when modulated by the modulation circuit, is about 30 kHz to about 132 kHz.

* * * * *